United States Patent
McFarland et al.

[15] 3,660,905
[45] May 9, 1972

[54] DISC BRAKE LINING THICKNESS GAUGE

[72] Inventors: Frederick R. McFarland; Walter L. Diffenderfer, both of Lancaster, Pa.

[73] Assignee: K-D Manufacturing Company, Lancaster, Pa.

[22] Filed: Sept. 26, 1969

[21] Appl. No.: 861,316

[52] U.S. Cl. ..........................................33/148 R, 33/180 AT
[51] Int. Cl. .......................................................G01b 5/00
[58] Field of Search ..............33/148 R, 148 E, 148 F, 149 R, 33/180 AT

[56] References Cited

UNITED STATES PATENTS

| | | | |
|---|---|---|---|
| 554,524 | 2/1896 | Mings | 33/148 E |
| 1,827,702 | 10/1931 | Kooyoomjian | 33/148 E |
| 2,468,362 | 4/1949 | Fournier | 33/148 F |
| 3,115,709 | 12/1963 | Litchfield | 33/149 R |

FOREIGN PATENTS OR APPLICATIONS 711,434  6/1965  Canada ................................33/149 R

*Primary Examiner*—William D. Martin, Jr.
*Attorney*—Paul & Paul

[57] ABSTRACT

A caliper type tool, scissors-like and spring biased open is provided with a scale means which accurately reads an amplified measurement, either in fractions, or percentages of the amount of lining left on a brake lining for disc brakes, while the lining is in assembled position in the disc brake assembly.

2 Claims, 3 Drawing Figures

PATENTED MAY 9 1972
3,660,905
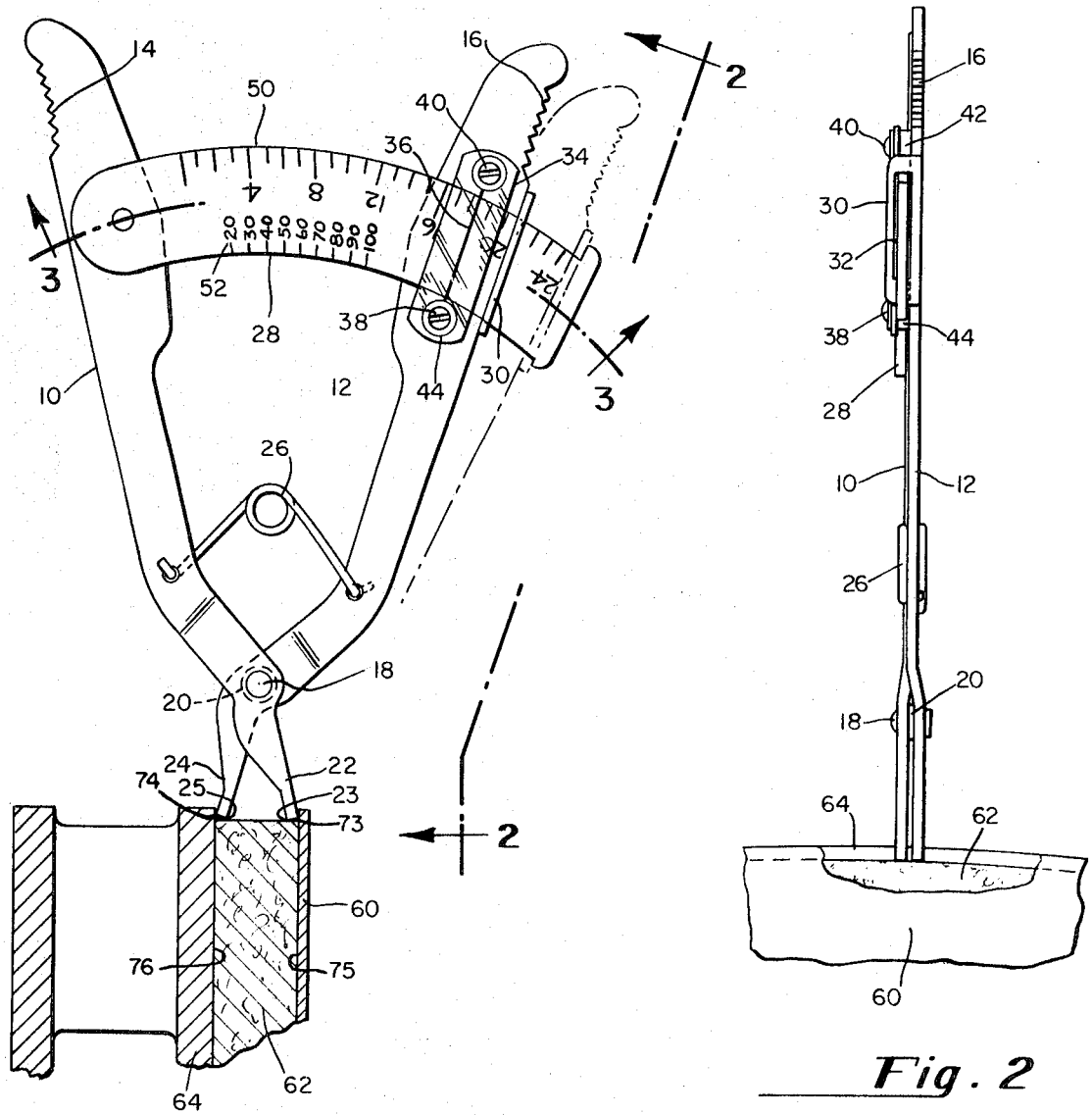
Fig. 1
Fig. 2
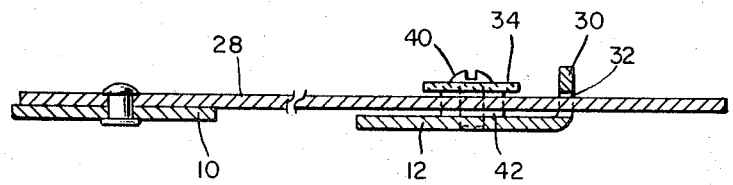
Fig. 3
INVENTORS.
Frederick R. McFarland
Walter L. Diffenderfer
BY Paul + Paul
ATTORNEYS.

DISC BRAKE LINING THICKNESS GAUGE

BACKGROUND OF THE INVENTION

This invention pertains to measuring devices and more particularly to a small hand tool for use in measuring the thickness of the lining on a disc brake.

With the advent of disc brakes and their increasing popularity in the automotive industry, States have enacted safety legislation including safety standards for disc brakes. As part of these safety standards it is often necessary to measure the amount of brake lining remaining on a used brake assembly. When this lining falls below a certain predetermined safety level, it must be replaced. It is desirable to provide the mechanic measuring this lining with a simple hand tool for quickly and accurately measuring the thickness of the lining particularly in terms of the wear. This wear can be measured as a percentage of the original brake lining or the lining can be measured directly in fractions of an inch and the measurement compared to the original brake lining thickness. It is further desirable to amplify the very minute measurements so that they can be easily and accurately read.

SUMMARY OF THE INVENTION

This invention provides a hand tool which fulfills the desirable characteristics mentioned above. It comprises a caliper-like hand tool of the crossover or scissors-like design which is spring biased open. That is, handles of the tool must be squeezed together in order to close the jaws. Mounted between the handles is a measuring device which amplifies the reading taken by the jaws and accurately presents it to the mechanic taking the measurement. In alternate embodiments the scale on the measuring device has indicia thereon which read in either fractions of an inch or percentages, and/or which can be adapted for use with a plurality of different classes of disc brake linings.

Accordingly, it is an object of this invention to provide a hand tool of the type described which can be used to easily and accurately measure worn disc brake linings and present the measurements so made in a form which can be readily read.

This and other objects of our invention will become apparent from the following description with reference to the accompanying drawings.

BRIEF DESCRIPTION OF THE DRAWINGS

FIG. 1 is an elevation of a device embodying our invention shown in operative relation to a portion of disc brake assembly, with alternate positions shown in phantom;

FIG. 2 is a view taken as indicated by the lines and arrows 2—2 in FIG. 1; and

FIG. 3 is a view taken as indicated by the lines and arrows 3—3 in FIG. 1, which has been foreshortened for the sake of clarity.

DESCRIPTION OF THE PREFERRED EMBODIMENTS

Although specific forms of the invention have been selected for illustration in the drawings, and the following description is drawn in specific terms for the purpose of describing these forms of the invention, this description is not intended to limit the scope of the invention which is defined in the appended claims.

The device in accordance with the preferred embodiment of our invention as shown in FIG. 1 in operative relation to a portion of a disc brake assembly. The device comprises a plurality of handles 10 and 12 each of which is a sheet metal stamping and each of which has a serrated finger grip portion 14 and 16 respectively at one end. The handles are joined close to the opposite end by a rivet 18 which passes through a clearance hole in each of the handles and a washer 20 which is disposed between the handles in order to space them apart and act as a bearing.

Each of the handles terminates in a jaw 22 and 24 respectively; the jaws being in crossover relation to the handles through the pivot at the rivet 18. Thus when one squeezes the handles together so that they move from the position shown in phantom in FIG. 1 to the position shown in full lines, the jaws move together.

Each of the jaws terminates in a tip which is approximately 0.062 inches wide. This narrow tip provides for very small and accurate measurements. The tips are equally spaced from the pivot point at the rivet 18 so that if the jaws were fully closed the tips would overlie one another and be coincident with one another. As shown each of the tips is rectangular at the ends so that a plurality of sharp edges are present, and a sharp edge is, therefore, presented to the faces between which a measurement is being taken. This configuration of the tips also provides inner edges 23 and 25 which rest against the lining 62 being measured. As clearly shown in the drawings, these inner corner referencing edges 23 and 25 extend from the inner corners of the rectangular tips. The outer corner sensing edges 73 and 74 extend parallel to the inner corner referencing edges 23 and 25 respectively, from the outer corners of the rectangular tips. As set forth hereinafter, the measurement of the percent of brake lining remaining, is taken with the device in the position shown in FIGS. 1 and 2, wherein, it will be noted, the inner edges 23 and 25 are resting on the exposed surface of the brake lining 62 and the outer corner sensing edges 73 and 74 are contacting the parallel spaced apart plane surfaces of the face of the back-up plate 60 and the face of the rotor 64 respectively. These outer sensing edges lie flat against these face surfaces 75,76 as shown thus the measurement is made more accurate in that it is taken on a straight line between the two sensing outer edges.

The handles are normally spring biased apart so that the jaws are normally open. To accomplish this a spring 26 is provided which passes through each handle and is bent over in order to retain it in position as shown.

The measurements taken by this instrument are normally rather small and their variations are even smaller. Therefore, it would be rather difficult to read them on a conventional scale. To overcome this problem we have provided an amplification means in the form of an arcuate scale mounted near the finger grip portion of the handles. The scale consists of an arcuate member 28 which is riveted to the handle 10 at one end and is free to ride across the handle 12 at the other end. The handle 12 is provided with an upraised flange 30 having a slot 32 therein through which the scale 28 slides. The free end of the scale 28 is T-shaped as shown in FIG. 1 so that it abuts the flange 30 when the tool is fully opened by the spring 26 as shown in phantom in FIG. 1.

An indicator plate 34 having an indicator line 36 thereon is mounted on the handle 12 and is spaced above the scale 28 by means of screws 38 and 40 and spacer bushings 42 and 44.

The indicia 50 along the outwardly disposed edge of the flat arcuate scale 28 provide a means for measuring in fractions of an inch the amount of lining left on the disc brake assembly. The scale is incremented to give readings in thirty-seconds of an inch. This scale was designed for use with common linings for disc brakes now being used in the automotive industry. Of course, it is to be understood that the scale could be varied if necessary within the scope of this invention. In particular, this invention contemplates the measuring of disc brake lining thicknesses in terms of a percentage of the lining remaining, for various grades or classes of linings. In this regard a plurality of different scales or sets of indicia could be displayed on the scale 28, as illustrated by the second set of indicia 52, shown in FIG. 1. This set measures in percentages from some minimum percentage on the left to a maximum on the right for the type of lining being measured. Of course, additional scales could be provided or scales could have indicia on them measuring a number of different percentages for different types with or without the fractional measurements shown in the preferred embodiment.

The device is used by placing the jaws 22 and 24 between the steel back-up plate 60 upon which the brake lining 62 is mounted, and the face of the rotor 64. It is common to have the back-up plate extend outwardly radially beyond the lining and to have the lining positioned inwardly radially from the outer edge of the rotor.

To use the gauge, a mechanic will check the original manufacturer's specification for rotor thickness and the State requirement for either percentage of thickness or acceptable width remaining. He will then grip the handles 10 and 12 by means of the finger grip portions 14 and 16 and squeeze the handles together thereby closing the jaws 22 and 24. With the jaws partially closed he will insert them in the space between the plate 60 and the rotor 64 and allow the spring 26 to force the jaws open into engagement with the plate and rotor. Thus, the gauge would take up the position as shown in FIG. 1. He will then be in a position to accurately read the indicia on the scale 28 under the line 36.

The indicator line 36 overlying the scale 28 indicates to the nearest thirty-secondth of an inch the thickness of the brake lining 62 on the set of indicia 50. For example, the reading shown indicates that there are slightly more than eighteen thirty-seconds of an inch of lining remaining.

It is to be noted that the brake need not be put "on" in order to take an accurate measurement, since the brake assemblies normally position the lining in a very close fit with the rotor and in some cases the lining even drags on the rotor in normal operating positions. However, where the rotor is particularly worn, it may be desirable to put the brake "on" in order to get a more accurate reading. When the brake is "on" the lining 62 presses against the rotor 64.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. A tool for measuring the brake lining thickness of a disc brake in assembled condition by taking an inside measurement between the parallel spaced apart plane surfaces adjoining the exposed surface of the lining, which extends perpendicular to said plane surfaces, comprising:
    a. a pair of elongated members pivotally interconnected for scissors-like action, each of said members having a grip portion at one end and a jaw portion at the other end, said jaw portion having tip means specially adapted for measuring said linings in assembled condition; each of said tip means comprising plane surfaces intersecting at right angles to form a rectangular tip; each of said tips presenting an inner corner referencing edge to the exposed surface of the lining and an outer corner sensing edge to one of the plane surfaces between which a measurement is being taken; said outer corner sensing edges lying flat against the parallel spaced apart plane surfaces when said inner edges are lying on the exposed surface of said lining, whereby an accurate measurement can be made of brake lining thickness; said tip means being equally spaced from said pivotal interconnection so that they would overlie one another and be coincident with one another when said jaw portions are fully closed;
    b. spring biasing means interconnecting said members along the grip portions to bias said members away from one another and to force said jaw portions away from one another;
    c. a scale attached to one of the members having indicia disposed along one face thereof and overlying the other member; and
    d. means mounted on one of said members cooperating with said indicia for indicating brake lining thickness as measured between the parallel spaced apart surfaces.

2. The invention of claim 1 wherein the indicia are disposed in sets along arcuate paths on said scale; one of said sets reading in percentages of the disc brake lining thickness remaining.

* * * * *